(12) United States Patent
Bouaziz

(10) Patent No.: US 9,446,716 B2
(45) Date of Patent: Sep. 20, 2016

(54) METHOD AND DEVICE FOR ADJUSTING A MIRROR FOR A MOTOR VEHICLE

(71) Applicant: AUDI AG, Ingolstadt (DE)

(72) Inventor: Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/429,182

(22) PCT Filed: Aug. 19, 2013

(86) PCT No.: PCT/EP2013/002485
§ 371 (c)(1),
(2) Date: Mar. 18, 2015

(87) PCT Pub. No.: WO2014/044341
PCT Pub. Date: Mar. 27, 2014

(65) Prior Publication Data
US 2015/0232033 A1    Aug. 20, 2015

(30) Foreign Application Priority Data

Sep. 21, 2012 (DE) .......... 10 2012 018 742

(51) Int. Cl.
*B60R 1/07* (2006.01)
*G06K 9/00* (2006.01)
*G06F 3/01* (2006.01)

(52) U.S. Cl.
CPC .............. *B60R 1/07* (2013.01); *G06F 3/013* (2013.01); *G06K 9/00597* (2013.01); *G06K 9/00845* (2013.01)

(58) Field of Classification Search
CPC ....... B60R 1/07; B60R 16/037; G06F 3/013; G06K 9/00597
USPC .......................................................... 701/49
See application file for complete search history.

(56) References Cited

U.S. PATENT DOCUMENTS

| | | | | | |
|---|---|---|---|---|---|
| 4,428,649 | A | * | 1/1984 | Main .......... | B60R 1/07 200/1 V |
| 4,894,650 | A | * | 1/1990 | Krieg .......... | B60R 1/02 200/4 |

(Continued)

FOREIGN PATENT DOCUMENTS

| | | |
|---|---|---|
| CN | 1129428 | 8/1996 |
| CN | 1365326 | 8/2002 |

(Continued)

OTHER PUBLICATIONS

EPO machine translation of DE 102004042712 (original DE document published Mar. 9, 2006).*

(Continued)

*Primary Examiner* — Behrang Badii
*Assistant Examiner* — David Testardi
(74) *Attorney, Agent, or Firm* — Staas & Halsey LLP

(57) ABSTRACT

A method adjusts a mirror for a motor vehicle. A viewing direction of a driver is detected by at least one viewing detection device. It is checked whether the viewing direction of the driver is directed to the mirror. The mirror located in the viewing direction of the driver is adjusted. The adjustment of the mirror located in the viewing direction of the driver only takes place if an actuation of an operating element for adjusting the mirror is also detected. A device adjusts a mirror for a motor vehicle.

18 Claims, 1 Drawing Sheet

(56) References Cited

U.S. PATENT DOCUMENTS

| | | | | |
|---|---|---|---|---|
| 5,694,259 | A * | 12/1997 | Brandin | B60R 1/07 307/10.1 |
| 6,333,753 | B1 * | 12/2001 | Hinckley | G06F 3/03543 345/156 |
| 6,397,137 | B1 * | 5/2002 | Alpert | B60R 1/07 351/209 |
| 8,702,250 | B2 * | 4/2014 | Raz | B60R 1/07 359/843 |
| 8,953,042 | B2 * | 2/2015 | Ueda | B60R 16/02 348/148 |
| 2004/0012867 | A1 | 1/2004 | Sakata | |
| 2010/0177413 | A1 * | 7/2010 | Lee | B60R 1/072 359/843 |
| 2010/0324779 | A1 * | 12/2010 | Takahashi | B60K 37/06 701/36 |

FOREIGN PATENT DOCUMENTS

| | | | | |
|---|---|---|---|---|
| DE | 20010607 | | 10/2001 | |
| DE | 102004042712 | A1 * | 3/2006 | B60R 1/07 |
| DE | 102005030968 | | 1/2007 | |
| DE | 60225219 | | 2/2009 | |
| DE | 102007049710 | A1 * | 4/2009 | B60K 35/00 |
| DE | 102009005729 | | 7/2010 | |
| DE | 10 2012 018 742.4 | | 9/2012 | |
| EP | 1562102 | A2 * | 8/2005 | B60K 37/06 |
| EP | 1574393 | | 9/2005 | |
| EP | PCT/2013/002485 | | 8/2013 | |
| JP | 8-2324 | | 1/1996 | |
| JP | 08058302 | A * | 3/1996 | |
| JP | 2008001150 | A * | 1/2008 | |
| JP | 2009208581 | A * | 9/2009 | |
| JP | 2010105417 | A * | 5/2010 | |
| KR | 1020110034155 | A * | 4/2011 | |
| WO | 2011/030958 | | 3/2011 | |

OTHER PUBLICATIONS

K-PION translation of KR 1020110034155 (original KR document published Apr. 5, 2011).*
Hinckley, Ken et al., "Touch-sensing input devices", ACM CHI '99, Conf. on Human Factors in Computing Systems, 1999, 8 pages.*
German Grant Decision for German Priority Patent Application No. 10 2012 018 742.4, issued Nov. 22, 2013, 12 pages.
English language International Search Report for PCT/EP2013/002485, mailed Sep. 25, 2013, 2 pages.
WIPO English Language Translation of the International Preliminary Report on Patentability for PCT/EP2013/002485, mailed on Apr. 16, 2015, 9 pages.
Chinese Office Action dated Mar. 23, 2016 from Chinese Patent Application No. 201380044515.5, 6 pages.

* cited by examiner

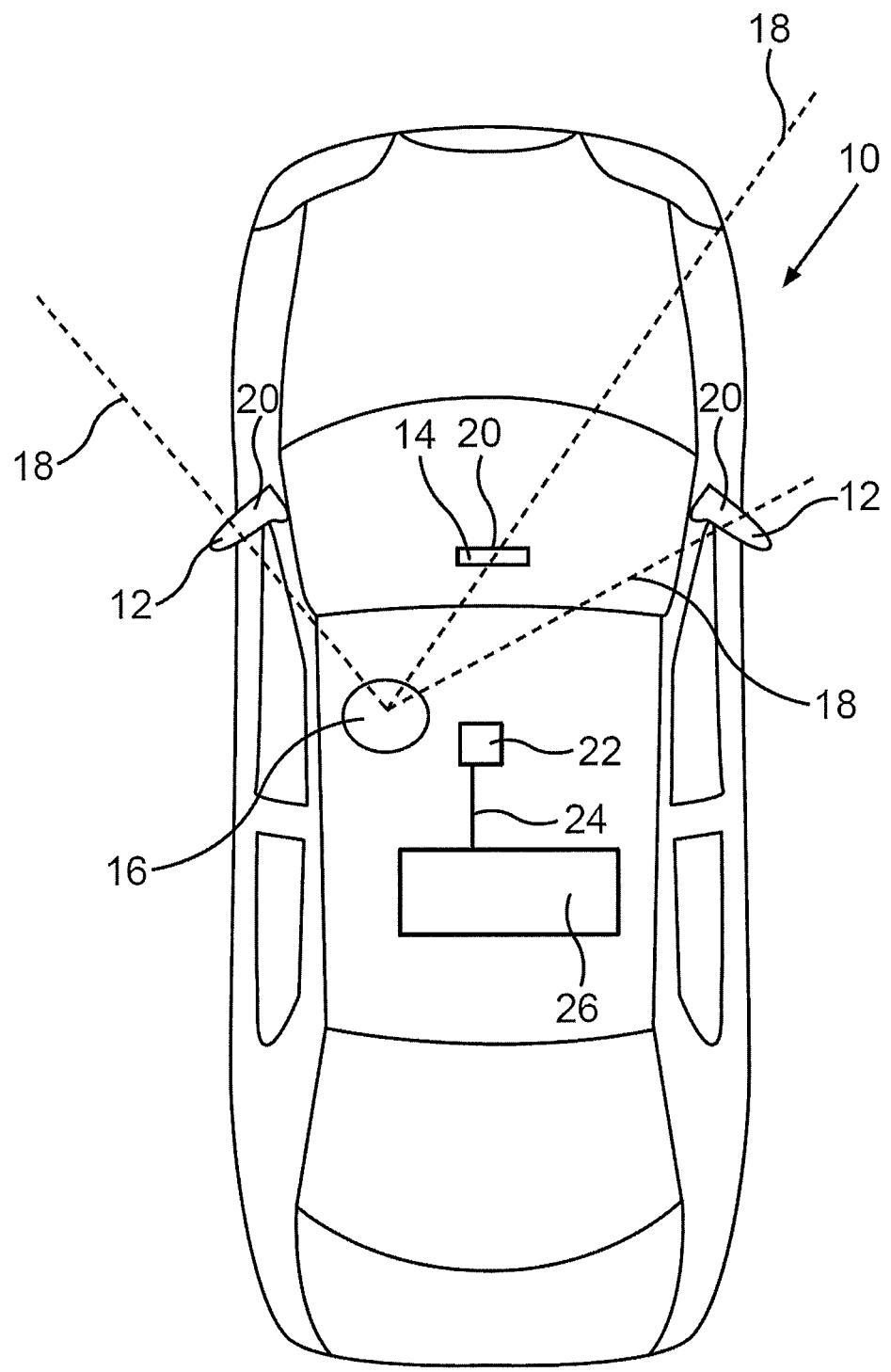

METHOD AND DEVICE FOR ADJUSTING A MIRROR FOR A MOTOR VEHICLE

CROSS REFERENCE TO RELATED APPLICATIONS

This application is based on and hereby claims priority to International Application No. PCT/EP2013/002485 filed on Aug. 19, 2013 and German Application No. 10 2012 018 742.4 filed on Sep. 21, 2012, the contents of which are hereby incorporated by reference.

BACKGROUND

The invention relates to a method for adjusting a mirror for a motor vehicle, and to a device for adjusting a mirror for a motor vehicle.

A method for automatic mirror orientation in the case of a vehicle is known from DE 10 2005 030 968 A1. In that case, a method is disclosed which provides automatic orientation of a mirror in the case of a vehicle, by a viewing direction of a driver being evaluated. In conjunction with an evaluation of a mirror plane over a period of time, the corresponding mirror is then electrically dynamically adjusted. However, since the orientation of the mirrors in a vehicle is highly individual and thus perceived differently by each driver, a fully automatic orientation of the mirrors cannot ensure every desired and thus optimum orientation. Consequently, until now, adjustments which are not perceived as optimum have been made.

SUMMARY

One possible object is thus to provide a method and a device for adjusting a mirror for a motor vehicle, which method ensures a particularly simple but nevertheless individual adjustment of the mirrors.

The inventor proposes a method for adjusting a mirror for a motor vehicle, in which a viewing direction of a driver is detected by at least one viewing detection device, it is checked whether the viewing direction of the driver is directed to the mirror, the mirror located in the viewing direction of the driver is adjusted. According to the proposal, firstly, a signal of the viewing detection device is detected by a control unit, said signal indicating that the viewing direction of the driver is directed to the mirror, then, an interrogation about an actuation of an operating element for adjusting the mirror is detected, whereupon an adjustment, desired by a driver, of the mirror located in the viewing direction of the driver only takes place after a positive interrogation about an actuation of the operating element.

The inventor also proposes a device for adjusting a mirror for a motor vehicle, having at least one viewing detection device, which is configured to detect a viewing direction of a driver and to check whether the viewing direction of the driver is directed to the mirror, and having a control device, which is configured to adjust the mirror located in the viewing direction of the driver. According to the proposal, the control device is configured to detect whether, firstly, a signal of the viewing detection device has been detected by the control unit, said signal indicating that the viewing direction of the driver is directed to the mirror, then, an interrogation about an actuation of an operating element for adjusting the mirror has been detected. The control device is configured to perform an adjustment, desired by a driver, of the mirror located in the viewing direction of the driver only after a positive interrogation about an actuation of the operating element.

The proposals are based on the knowledge that although automatic adjustment can lead to a good result, it is not perceived as optimum in every case, however, owing to highly individual desires of the driver.

In order to provide a method for adjusting a mirror for a motor vehicle, which permits particularly simple but nevertheless individual adjustment, provision is made to firstly detect the viewing direction of a driver using at least one viewing detection device. It is checked whether the viewing direction of the driver is directed to the mirror to be adjusted. Said mirror to be adjusted is only then adjusted if an actuation of an operating element for adjusting the mirror is also detected.

In this way, a particularly simple and hence convenient adjustment of the mirror is ensured and, at the same time, the driver has independent control over the adjustment in order to effect his specific adjustment of the mirror. In addition, in this way, all of the mirrors of the vehicle can be adjusted with only one operating element, which likewise leads to a particularly simple and hence convenient adjustment of the mirrors.

In another embodiment, it has proven to be advantageous for the viewing direction of the driver to be detected by a viewing detection device, which is arranged on the mirror. Thus, a particularly targeted detection of the viewing direction of the driver can be ensured, which in turn leads to a particularly good adjustment of the mirror.

In this connection, in another variant, it has proven to be advantageous for the viewing direction of the driver to be detected by a camera device. Such systems are already known in practice and are particularly reliable and sure when detecting the viewing direction of the driver.

It has also proven to be advantageous, in another variant embodiment, for the viewing direction of the driver to be detected by a plurality of viewing detection devices. Owing to an evaluation of a plurality of signals of the respective viewing detection devices about the viewing direction of the driver, the detection of the viewing direction is thus possible in an even more precise and more reliable manner, with the result that an even better adjustment of the mirror is possible.

In order to provide a device for adjusting a mirror for a motor vehicle, which device comprises at least one viewing detection device, which is configured to detect a viewing direction of a driver and to check whether the viewing direction of the driver is directed to the mirror, and comprises a control device, which is configured to adjust the mirror located in the viewing direction of the driver, provision is made for the device to comprise a control device which is configured to detect whether the operating element for adjusting the mirror has also been actuated and, only in this case, to adjust the mirror.

Such a device thus ensures a particularly simple and hence convenient adjustment of the desired mirror. At the same time, the driver has independent control over the adjustment in order to effect his specific adjustment of the desired mirror. In addition, in this way, all of the mirrors of the vehicle can be adjusted with only one operating element, which likewise leads to a particularly simple and hence convenient adjustment of the mirrors.

The advantages and preferred embodiments described for the proposed method also apply to the proposed device, and vice versa. In particular, the device units with which the method can be performed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

Here, the single FIGURE shows a schematic plan view of a motor vehicle with respective side mirrors and a rear-view mirror. Respective exterior mirrors 12 and a rear-view mirror 14 can be seen.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

At the level of a position of a front seat, on a left-hand side of a passenger compartment of the motor vehicle 10, a possible seat position 16 of a driver can be seen. Possible viewing directions 18 of the driver run in the direction of the exterior mirrors 12 or in the direction of the rear-view mirror 14. In a variant embodiment, respective viewing detection devices 20 can be integrated in the mirrors 12, 14, wherein said viewing detection devices 20 are not illustrated further in the FIGURE itself. In a variant embodiment, it is conceivable that the viewing direction 18 of the driver is determined using permanent sensors being components of the viewing detection device 20. It is also conceivable that the viewing detection device 20 has an infrared device, by which a viewing direction 18 is also determined in the dark.

Furthermore, in the region of the seat position 16, an operating element 22 can be seen, which is coupled to a control device 26 via a line 24. Provision is likewise made for said control device 26 to be coupled both to the respective viewing detection devices 20 and to the corresponding devices for adjusting the mirrors 12, 14. In a variant embodiment, the operating element 22 can be designed, for example, as a 4-way joystick, as a result of which all of the mirrors 12, 14 are then adjustable on the basis of the detected viewing direction 18 of the driver. In this case, it is likewise conceivable that a possible operation of the operating element 22 is registered by the permanent sensors being components of the operating element 22. Only when the driver focuses on one of the mirrors 12, 14, this is registered by the control device 26 via the viewing detection device 20 and, in addition, the operation of the operating element 22 is registered, does an adjustment of the desired mirror 12, 14 take place.

An exemplary embodiment of the method a for adjusting the mirrors 12, 14 for a motor vehicle is described below.

If the driver directs his viewing direction 18, for example, to the left-hand exterior mirror 12, the viewing detection device 20 identifies said state. Correspondingly, a signal is sent to the control unit 26. It is conceivable that, at the same time, a movement of the operating element 22 is registered by the permanent sensors of the operating element 22 and likewise a corresponding signal is sent to the control unit 26. The control unit 26 evaluates the signals and an adjustment, desired by the driver, of the left-hand exterior mirror 12 takes place.

In an alternative embodiment, it is also conceivable that, firstly, only the signal of the viewing detection device 20 reaches the control unit 26 and, as a result, an interrogation about a possible movement of the operating element 22 takes place. Accordingly, an adjustment, desired by the driver, of the mirror 12 would only be performed after said interrogation about a possible movement of the operating element 22 is positive.

In another embodiment, it is also conceivable that, firstly, a signal about a movement of the operating element 22 reaches the control unit. Only on the basis of said signal does the control unit send an interrogation about a possible viewing direction 18 of the driver in the direction of one of the mirrors 12, 14 of the motor vehicle 10. An adjustment, desired by the driver, of the mirror 12, 14 located in the viewing direction 18 is then only performed on the basis of said signal.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for adjusting a mirror for a motor vehicle, comprising:
   detecting, by a controller of the motor vehicle, movement of an operating element for adjusting the mirror;
   in response to detecting movement of the operating element, the controller transmitting an interrogation signal to a viewing detector which detects a viewing direction of a driver, to determine whether the viewing direction of the driver is directed to the mirror;
   in response to receiving the interrogation signal, the viewing detector identifying the viewing direction of the driver and transmitting to the controller a viewing direction signal which includes information indicating whether the viewing direction of the driver is directed to the mirror;
   receiving the viewing direction signal and analyzing the viewing direction signal to determine whether the viewing direction of the driver is directed to the mirror, by the controller; and
   after determining that the viewing direction signal indicates that the viewing direction of the driver is directed to the mirror based on the analyzing, the controller enabling performance of an adjustment, desired by the driver, of the mirror located in the viewing direction of the driver according to actuation of the operating element,
   wherein the operating element is a joystick provided in a region of a seat position of the driver.

2. The method as claimed in claim 1, wherein the viewing detector is arranged on the mirror.

3. The method as claimed in claim 1, wherein the viewing detector is a camera device that detects the viewing direction of the driver.

4. The method as claimed in claim 1, wherein a plurality of viewing detectors are provided to detect the viewing direction of the driver.

5. The method as claimed in claim 1, wherein
   the motor vehicle has a plurality of mirrors,
   the viewing detector detects which mirror of the plurality of mirrors is the mirror to which the viewing direction of the driver is directed, and
   the controller adjusts only the mirror to which the viewing direction of the driver is directed.

6. The method as claimed in claim 1, wherein
the motor vehicle has a plurality of mirrors, and
each of the mirrors is individually adjusted with a single operating element, based on a detection of which mirror is in the viewing direction of the driver.

7. The method as claimed in claim 1, wherein
the motor vehicle has a plurality of mirrors, and
each mirror has a corresponding viewing detector integrated therein.

8. The method as claimed in claim 1, wherein
the motor vehicle has a plurality of mirrors, and
the joystick is a 4-way joystick by which all of the mirrors can be adjusted based on the viewing direction of the driver.

9. The method as claimed in claim 1, wherein the viewing detector is an infrared device to detect the viewing direction of the driver in the dark.

10. The method as claimed in claim 1, wherein
the motor vehicle has a plurality has a plurality of mirrors, and
the adjustment is made only of the mirror to which the viewing direction of the driver is directed.

11. A system to adjust a mirror for a motor vehicle, comprising:
a viewing detector to detect a viewing direction of a driver and to transmit a viewing direction signal which includes information indicating whether the viewing direction of the driver is directed to the mirror; and
a controller configured:
to detect movement of an operating element for adjusting the mirror;
to transmit an interrogation signal to the viewing detector to determine whether the viewing direction of the driver is directed to the mirror, in response to detecting movement of the operating element;
to receive the viewing direction signal from the viewing detector, in response to the viewing detector receiving the interrogation signal;
to analyze the viewing direction signal received from the viewing detector to determine whether the viewing direction of the driver is directed to the mirror; and
after determining that the viewing direction signal indicates that the viewing direction of the driver is directed to the mirror based on the analysis of the viewing direction signal, to enable performance of an adjustment desired by the driver, of the mirror located in the viewing direction of the driver according to actuation of the operating element,
wherein the operating element is a joystick provided in a region of a seat position of the driver.

12. The system as claimed in claim 11, wherein
the viewing detector is arranged on the mirror.

13. The system as claimed in claim 12, wherein
the viewing detector comprises a camera device that detects the viewing direction of the driver.

14. The system as claimed in claim 11, wherein
a plurality of viewing detectors are provided to detect the viewing direction of the driver.

15. The system as claimed in claim 11, wherein
the motor vehicle has a plurality of mirrors,
the viewing detector detects which mirror of the plurality of mirrors is the mirror to which the viewing direction of the driver is directed, and
the controller adjusts only the mirror to which the viewing direction of the driver is directed.

16. The system as claimed in claim 11, wherein
the motor vehicle has a plurality of mirrors, and
each of the mirrors is individually adjusted with a single operating element, based on a detection of which mirror is in the viewing direction of the driver.

17. The system as claimed in claim 11, wherein
the motor vehicle has a plurality of mirrors, and
each mirror has a corresponding viewing detector integrated therein.

18. A system to adjust a mirror for a motor vehicle, comprising:
a viewing detector to detect a viewing direction of a driver and to transmit a viewing direction signal which includes information indicating whether the viewing direction of the driver is directed to the mirror; and
a controller configured:
to detect movement of an operating element for adjusting the mirror;
to transmit an interrogation signal to the viewing detector to determine whether the viewing direction of the driver is directed to the mirror, in response to detecting movement of the operating element;
to receive the viewing direction signal from the viewing detector, in response to the viewing detector receiving the interrogation signal;
to analyze the viewing direction signal received from the viewing detector to determine whether the viewing direction of the driver is directed to the mirror; and
after determining that the viewing direction signal indicates that the viewing direction of the driver is directed to the mirror based on the analysis of the viewing direction signal, to enable performance of an adjustment desired by the driver, of the mirror located in the viewing direction of the driver according to actuation of the operating element,
wherein
the motor vehicle has a plurality of mirrors, and
the operating element is a 4-way joystick by which all of the mirrors can be adjusted based on the viewing direction of the driver.

* * * * *

UNITED STATES PATENT AND TRADEMARK OFFICE
CERTIFICATE OF CORRECTION

| | | |
|---|---|---|
| PATENT NO. | : 9,446,716 B2 | Page 1 of 1 |
| APPLICATION NO. | : 14/429182 | |
| DATED | : September 20, 2016 | |
| INVENTOR(S) | : Tahar Bouaziz | |

It is certified that error appears in the above-identified patent and that said Letters Patent is hereby corrected as shown below:

In the Claims

Column 5, Line 20, Claim 10:

Delete "has a plurality has a plurality" and insert -- has a plurality --, therefor.

Signed and Sealed this
Third Day of January, 2017

Michelle K. Lee
*Director of the United States Patent and Trademark Office*